(12) United States Patent
Yoo

(10) Patent No.: US 10,150,195 B2
(45) Date of Patent: Dec. 11, 2018

(54) METHOD FOR MANUFACTURING STOP COLLAR FOR PIPE FITTING DEVICE AND STOP COLLAR

(71) Applicant: UNILOK CORPORATION, Incheon (KR)

(72) Inventor: Myoung-Ho Yoo, Seoul (KR)

(73) Assignee: UNILOK CORPORATION, Incheon (KR)

( * ) Notice: Subject to any disclaimer, the term of this patent is extended or adjusted under 35 U.S.C. 154(b) by 474 days.

(21) Appl. No.: 14/938,965

(22) Filed: Nov. 12, 2015

(65) Prior Publication Data

US 2016/0319967 A1 Nov. 3, 2016

(30) Foreign Application Priority Data

Apr. 28, 2015 (KR) .................. 10-2015-0059416

(51) Int. Cl.
| | |
|---|---|
| *B21C 23/14* | (2006.01) |
| *B24B 1/00* | (2006.01) |
| *C22F 1/04* | (2006.01) |
| *C22F 1/16* | (2006.01) |
| *C21D 1/18* | (2006.01) |
| *C21D 9/00* | (2006.01) |
| *C21D 1/28* | (2006.01) |
| *C25D 11/04* | (2006.01) |
| *C25D 11/16* | (2006.01) |

(Continued)

(52) U.S. Cl.
CPC .............. *B24B 1/00* (2013.01); *B21C 23/14* (2013.01); *C21D 1/18* (2013.01); *C21D 1/28* (2013.01); *C21D 9/0068* (2013.01); *C22F 1/04* (2013.01); *C22F 1/165* (2013.01); *C25D 11/04* (2013.01); *C25D 11/16* (2013.01); *C25D 11/34* (2013.01); *F16L 19/08* (2013.01)

(58) Field of Classification Search
CPC ...... E21B 17/1078; E21B 17/02; F16L 15/08; F16L 19/0206; F16L 19/08; F16L 19/083; F16L 19/086; B21C 23/14; B21C 23/142; B21C 35/023; B21C 35/04
See application file for complete search history.

(56) References Cited

U.S. PATENT DOCUMENTS

4,040,162 A * 8/1977 Isogai .................. B21C 23/002
                                                        29/403.2
5,802,719 A * 9/1998 O'Farrell, Jr. ....... A61B 6/4405
                                                        29/897.35

(Continued)

*Primary Examiner* — Edward Tolan
(74) *Attorney, Agent, or Firm* — Im IP Law; C. Andrew Im; Chai Im

(57) ABSTRACT

A method for manufacturing a stop collar for a pipe fitting device. A raw material is prepared and heated to a temperature of more than 350° C. The heated raw material is extruded to obtain an extrudate taking a C shape at the front surface thereof and having one or more check protrusions formed on the outer surface thereof. The extrudate is subjected to a solution treatment, cooling treatment, and cutting. An elastic member is prepared from a metal spring steel and folded portions are formed thereon by multi-foaming. The extrudate and the elastic member are coupled to form the stop collar and burrs are removed from the stop collar. The surface of the stop collar are coated with ceramic to provide identification of the pipe use.

12 Claims, 9 Drawing Sheets

(51) Int. Cl.
*C25D 11/34* (2006.01)
*F16L 19/08* (2006.01)

(56) References Cited

U.S. PATENT DOCUMENTS 6,446,857 B1 * 9/2002 Kent .................... B23K 1/0008
228/139
6,508,493 B1 * 1/2003 Guivarc'h ........... F16L 19/0231
285/354

* cited by examiner

METHOD FOR MANUFACTURING STOP COLLAR FOR PIPE FITTING DEVICE AND STOP COLLAR

RELATED APPLICATIONS

This application claims priority from Korean Patent Application No. 10-2015-0059416 filed Apr. 28, 2015, which is herein incorporated by reference in its entirety.

BACKGROUND OF THE INVENTION

Field of the Invention

The present invention relates to a method for manufacturing a stop collar for a pipe fitting device and a stop collar manufactured by the same, and more particularly, to a method for manufacturing a stop collar for a pipe fitting device and a stop collar manufactured by the same wherein a raw material is machined sequentially through extrusion molding, heat treatment, cutting, and grinding, thus enabling a standardized stop collar to be produced in large quantities, and an elastic force is applied to the stop collar, thus providing easy fastening and repeatable uses and further preventing the pipe fitting device and connected pipes by the pipe fitting device from being damaged.

Background of the Related Art

Generally, two or more pipes are connected to each other by means of a simple connection part like an elbow or fitting, that is, a pipe fitting device, according to the construction conditions and the environments at the construction site.

The pipe fitting device is adapted to grasp pipes fitted to both sides or three directions of a body by means of ferrules moving by nuts and to connect the pipes with each other.

For example, Korean Utility Model Application Laid-open No. 2007-000500 discloses a pipe fitting device that basically includes a fitting body to which pipes are fitted, ferrules, and nuts and further has O-rings disposed on the inner peripheries of connection holes to which the pipes are connected and disposed on the inclined surfaces of the inner and outer peripheries of the connection holes, thus increasing the sealing effects thereof.

According to the conventional pipe fitting device, after the pipes are inserted into the fitting body, the nuts are tightened to grasp the pipes. At this time, however, it is hard to expect an amount of nut tightening, so that the nuts are loosely or excessively tightened, the pipes are deformed to cause the dangers of leakage.

So as to check the accurate amount of nut tightening, recently, stop collars (fitting rings) have been developed and used.

One example of conventional stop collars for a pipe fitting device is disclosed in Korean Patent Registration No. 10-1356612.

Another example is disclosed in Korean Patent Registration No. 10-0948403 suggesting a pipe fitting and a method for manufacturing a fitting ring for a pipe fitting.

The method for manufacturing a fitting ring for a pipe fitting includes the steps of: preparing a lower mold as an injection mold having a steel piece mounting portion protruding from the center of the inner surface thereof to support a ring-shaped steel piece and a ring molding space formed along the periphery of the steel piece mounting portion; preparing the ring-shaped steel piece as an insert coming into close contact with the periphery of the steel piece mounting portion of the lower mold; preparing an upper mold as an injection mold having a tail molding portion protruding on the center of the lower portion thereof in such a manner as to advance into the ring molding space of the lower mold and a sprue formed on one side thereof, through which a fused material is injected into the ring molding space of the lower mold; coupling the ring-shaped steel piece to the periphery of the steel piece mounting portion of the lower mold; coupling the lower mold to the upper mold so that the tail molding portion of the upper mold is introduced into the ring molding space of the lower mold; injecting the fused material into the sprue of the upper mold so as to introduce the fused material into the ring molding space of the lower mold; and cooling the fused material injection-molded through the upper mold and the lower mold at a normal temperature.

In more detail, the fused material as a rubber material is injected into the upper mold and the lower mold so as to obtain the molded product, and further, the ring-shaped steel piece is disposed on the inner surface of the molded product so as to enhance the strength of the fitting ring, thus preventing the breakage of the fitting ring while in use. Furthermore, the outer shape of the fitting ring is inclinedly formed to increase the contacted area with the pipe fitting device. However, the conventional fitting ring is made through the injection molding, thus making it impossible to conduct precise machining, and besides, it cannot be checked whether fitting nuts are loosely or excessively tightened. Of course, undesirably, the conventional fitting ring cannot be re-used.

SUMMARY OF THE INVENTION

Accordingly, the present invention has been made in view of the above-mentioned problems occurring in the prior art, and it is an object of the present invention to provide a method for manufacturing a stop collar for a pipe fitting device and a stop collar manufactured by the same wherein the stop collar is made to have a shape of "C" and an elastic force is thus applied to the stop collar, thus providing easy assembling and repeatable uses.

It is another object of the present invention to provide a method for manufacturing a stop collar for a pipe fitting device and a stop collar manufactured by the same wherein a given color is coated on the surface of the stop collar and an identification member is further provided on the stop collar, thus making it possible to indentify the types of pipes fitted by the pipe fitting device and providing easy maintaining and checking.

It is yet another object of the present invention to provide a method for manufacturing a stop collar for a pipe fitting device and a stop collar manufactured by the same wherein the stop collar is fitted to a body of the pipe fitting device and thus comes into close contact with a fixing protrusion portion of the body through the tightening of nut members, so that if the stop collar is freely rotated on the body, the nut members are more tightened, and if the stop collar is not rotated anymore through the restraint in the rotation of the stop collar by the nut members, the nut members are not tightened anymore, which means the pipes are connected to each other at an optimum state.

To accomplish the above-mentioned objects, according to a first aspect of the present invention, there is provided a method for manufacturing a stop collar for a pipe fitting device, the stop collar being disposed on a body of the pipe fitting device to allow the connected state of pipes to be recognized, the method including the steps of: preparing a raw material selected from the group consisting of aluminum or zinc and heating the raw material to a temperature of more than 350° C.; extruding the heated raw material through an extrusion mold to obtain an extrudate taking a shape of "C" at the front surface thereof and having one or more check protrusions formed on the outer surface thereof; allowing the extrudate to be subjected to solution treatment so that the extrudate is heated to a temperature in the range of 450 to 650° C. for 5 to 7 hours; allowing the heat-treated extrudate to be subjected to cooling treatment wherein the extrudate is normalized or quenched; allowing the heat-treated extrudate to be subjected to cutting wherein the extrudate intermittently moves and stops and then cuts to a given length through the rotation of a saw; preparing metal spring steel to make an elastic member through slotting of the metal spring steel; forming folded portions on the elastic member by means of multi-foaming in such a manner as to be open or closed, the folded portions being bent at the same positions as the check protrusions of the extrudate; allowing the elastic member to come into contact with the inner surface of the cut extrudate and coupling the extrudate and the elastic member to each other by means of pressing to make an original shape of the stop collar; removing burrs from the original shape of the stop collar; and coating ceramic having any one of red, blue, yellow, and black onto the surface of the original shape of the stop collar to indentify the uses of the pipes.

To accomplish the above-mentioned objects, according to a second aspect of the present invention, there is provided a stop collar for a pipe fitting device including: a body taking a shape of "C" through extrusion of aluminum and having two check protrusions formed on the outer surface of the body in such a manner as to be located on a straight line; and an elastic part located on the inner surface of the body to allow the stop collar to be repeatedly used.

To accomplish the above-mentioned objects, according to a third aspect of the present invention, there is provided a stop collar for a pipe fitting device including: a body taking a shape of "C" through extrusion of aluminum and having two check protrusions formed on the outer surface of the body in such a manner as to be located on a straight line; and an identification member having coupling portions formed on the inner surface thereof in such a manner as to be fitted to the check protrusions of the body and an extension piece formed extended outward from the middle portion thereof.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a method for manufacturing a stop collar for a pipe fitting device and a stop collar manufactured by the same according to the present invention will be in detail given with reference to the attached drawing.

Figure 1:
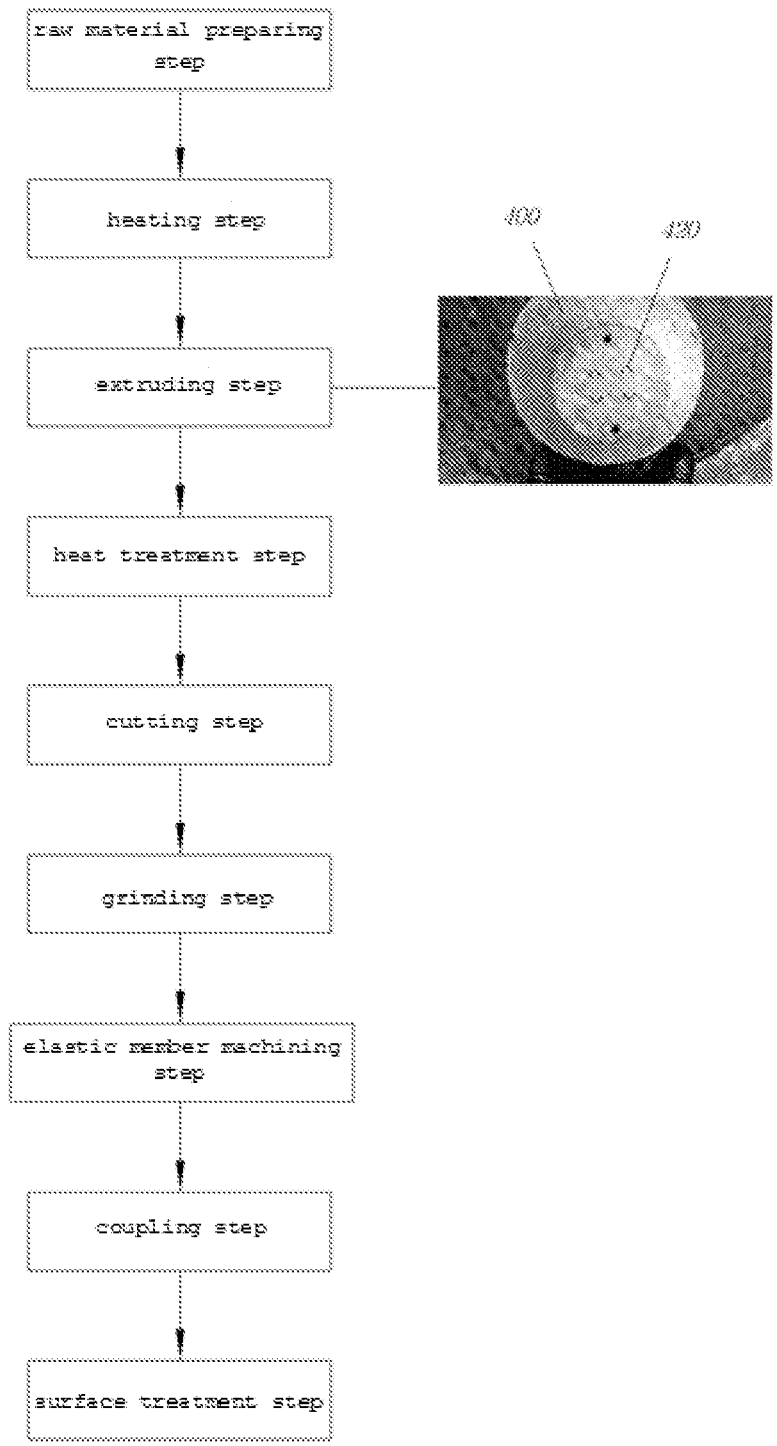
FIG. 1 is a flowchart showing a method for manufacturing a stop collar for a pipe fitting device according to the present invention.
Figure 2:
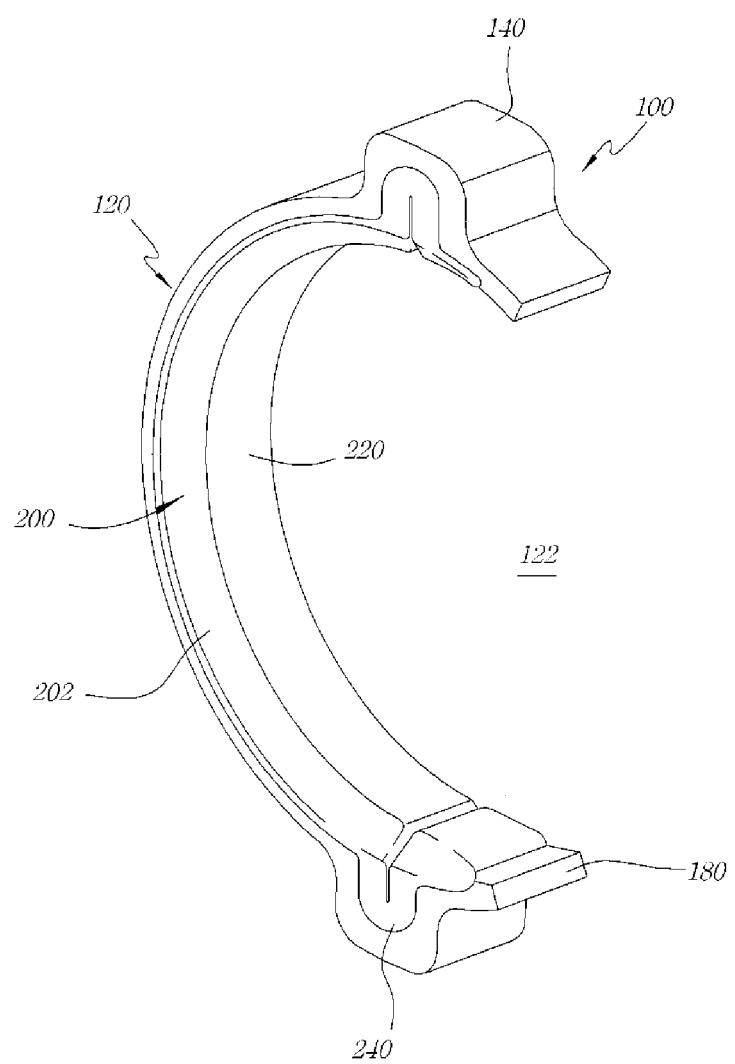
FIG. 2 is a perspective view showing a stop collar according to a first embodiment of the present invention.
Figure 3:
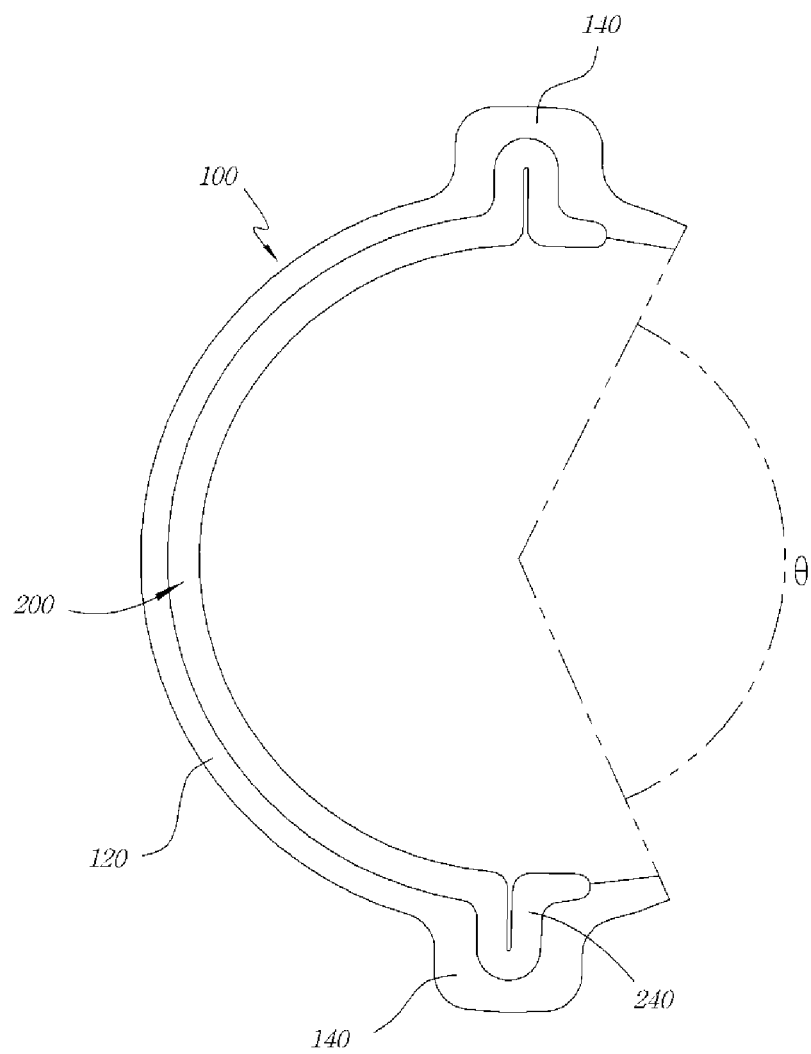
FIG. 3 is one side view showing the stop collar according to the first embodiment of the present invention.
Figure 4:
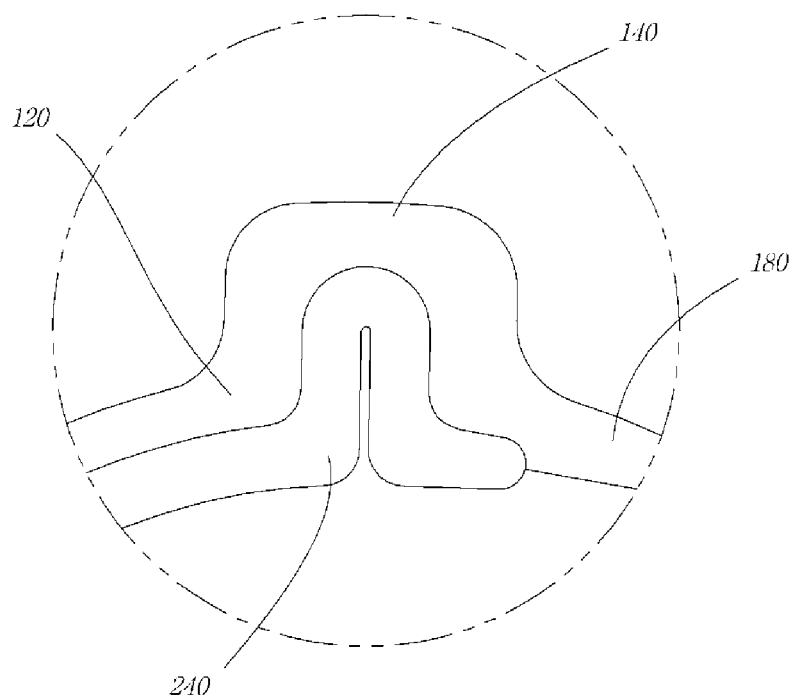
FIG. 4 is an enlarged perspective view showing the main parts of the stop collar according to the first embodiment of the present invention.

FIG. 1 is a flowchart showing a method for manufacturing a stop collar for a pipe fitting device according to the present invention, FIG. 2 is a perspective view showing a stop collar according to a first embodiment of the present invention, FIG. 3 is one side view showing the stop collar according to the first embodiment of the present invention, and FIG. 4 is an enlarged perspective view showing the main parts of the stop collar according to the first embodiment of the present invention.

Figure 5:
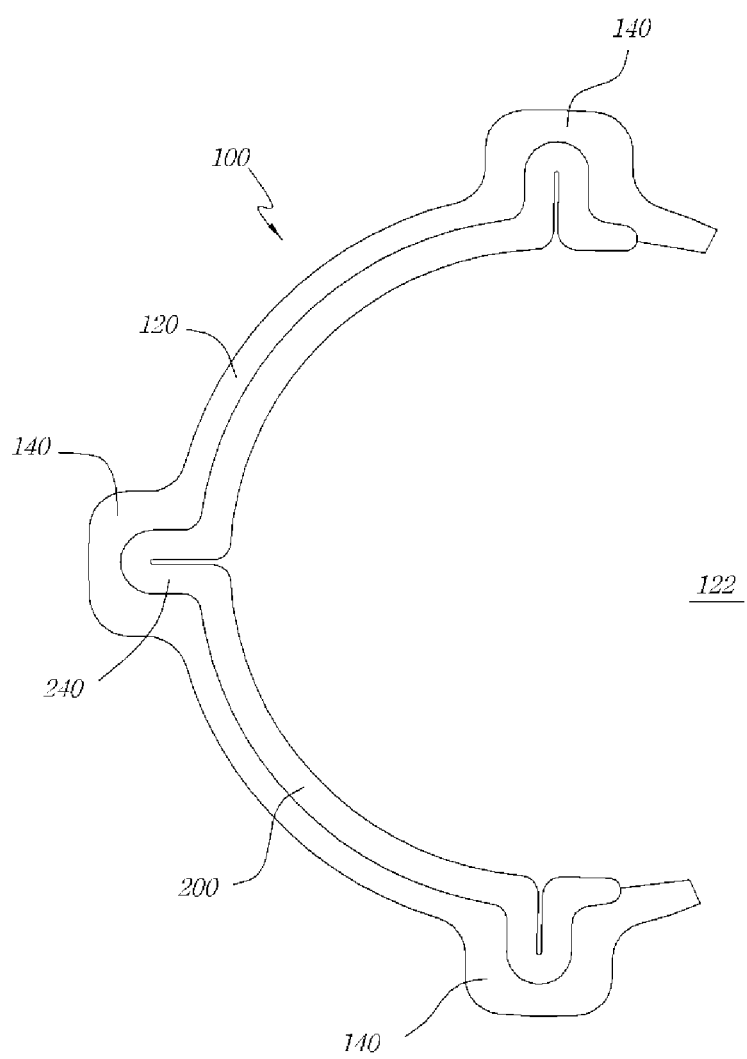
FIG. 5 is one side view showing the stop collar according to a second embodiment of the present invention.
Figure 6A:
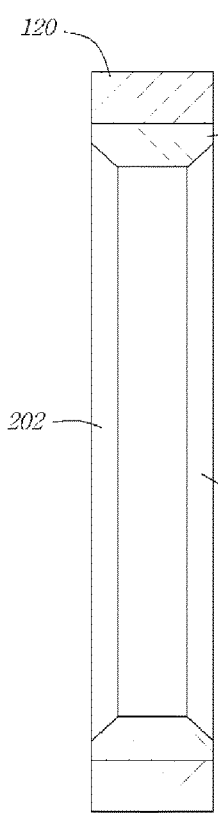
FIGS. 6A to 6C are sectional views showing various examples of an elastic member on the front surface of the stop collar according to the present invention.
Figure 6B:
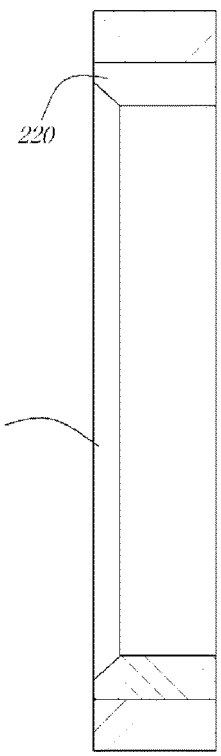
Figure 6C:
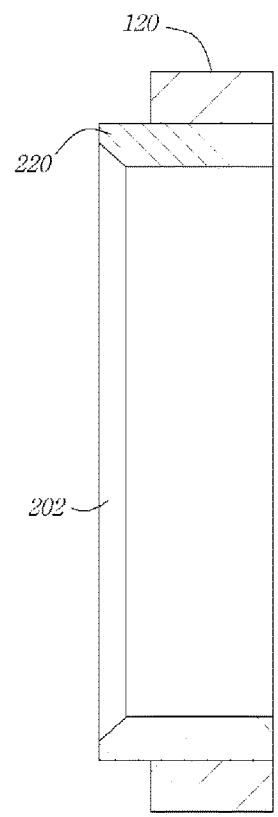
Figure 7:
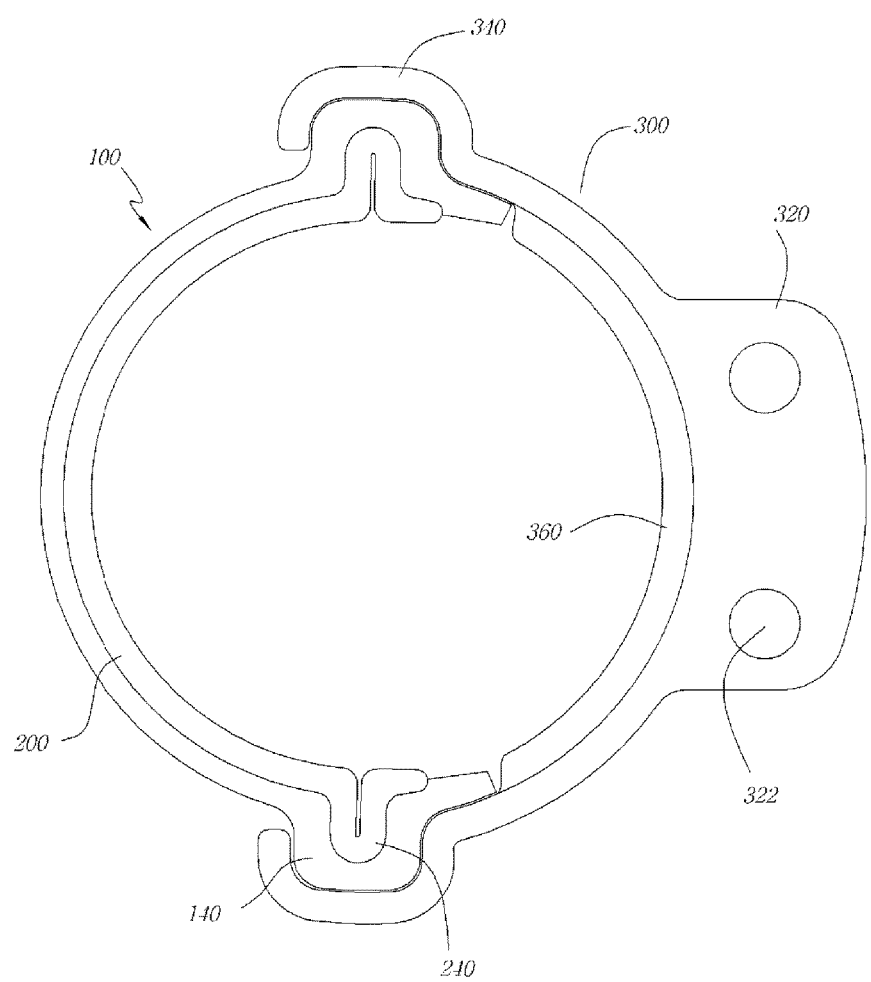
FIG. 7 is a sectional view showing the assembled state of an identification member to the stop collar according to the present invention.
Figure 8A:
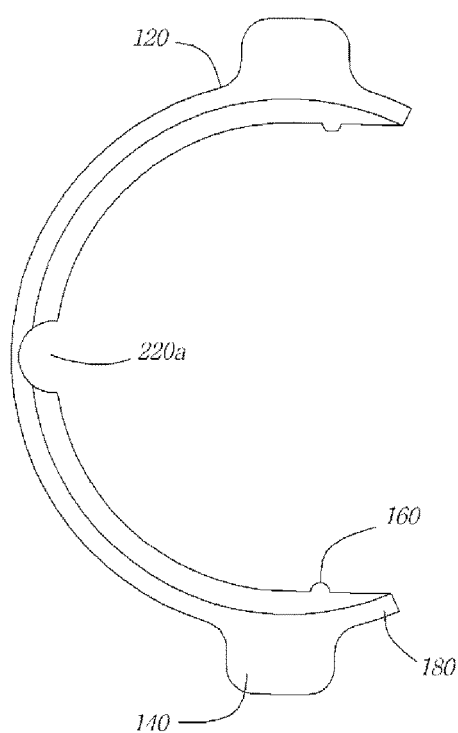
FIGS. 8A and 8B are one side views showing stop collars according to a third embodiment of the present invention.
Figure 8B:
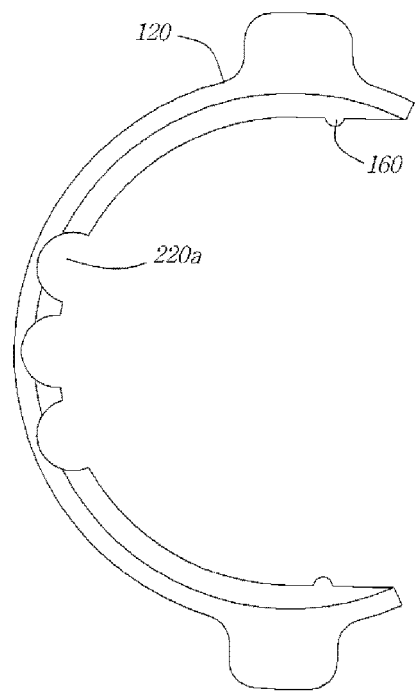
Figure 9:
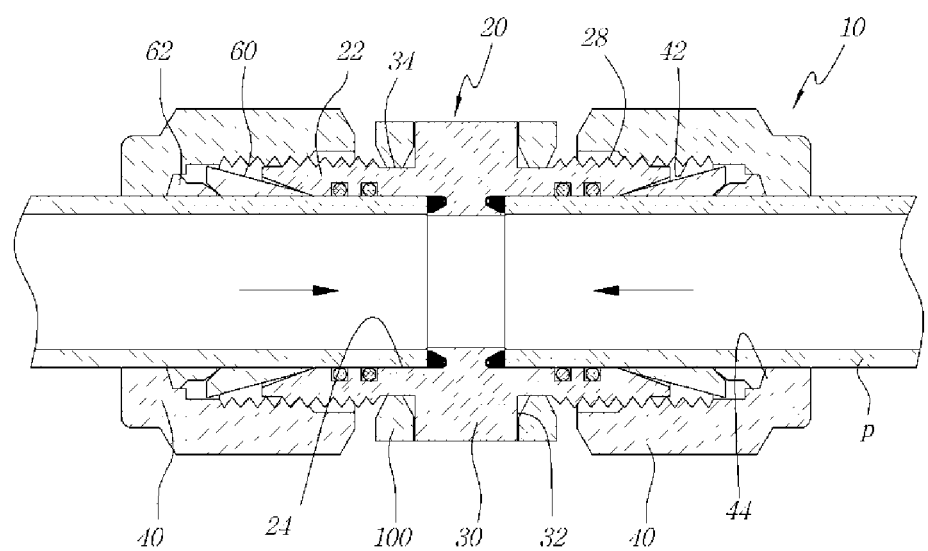
FIG. 9 is a sectional view showing a pipe fitting device in which the stop collar for the present invention is adopted.

FIG. 5 is one side view showing the stop collar according to a second embodiment of the present invention, FIGS. 6A to 6C are sectional views showing various examples of an elastic member on the front surface of the stop collar according to the present invention, FIG. 7 is a sectional view showing the assembled state of an identification member to the stop collar according to the present invention, FIGS. 8A and 8B are one side views showing stop collars according to a third embodiment of the present invention, and FIG. 9 is a sectional view showing a pipe fitting device in which the stop collar for the present invention is adopted.

A stop collar 100 according to the present invention is fastened to a body of a pipe fitting device 10 to allow the connected state of pipes P to be recognized by a worker, to allow the types of the connected pipes P to be identified after the work, and further to allow the management state of the pipes P to be checked easily.

A stop collar 100 according to the present invention largely includes a body 120 made of an extrudate and an elastic part 200 coupled to the body 120. According to a first embodiment of the present invention, the elastic part 200 includes an elastic member 220, and according to a second embodiment of the present invention, the stop collar 100 further includes an identification member 300 adapted to allow the types of pipes and the management state of the pipes to be recognized and checked by a worker. According to a third embodiment of the present invention, further, the stop collar 100 has one or more grooves formed on the inner surface of the body 120 so as to apply an elastic force to the body 120.

The stop collar 100 according to the present invention is manufactured by extruding and molding a raw material selected from the group consisting of aluminum or zinc, by conducting heat treatment for the extruded raw material to adjust required hardness, and by applying a ceramic film to the surface of the heat-treated raw material so as to allow the use purpose for the pipe fitting device in which the stop collar is adopted to be checked by a worker.

According to the first embodiment of the present invention, the stop collar 100 includes the body 120 and the elastic part 200 coupled to the body 120 and having the elastic member 220 made of spring steel.

According to the first embodiment of the present invention, the body 120 is extruded through an extrusion mold 400. That is, the raw material selected from the group consisting of aluminum or zinc is heated to a temperature in the range of 550 to 650° C. and supplied and molded to the extrusion mold 400.

Molding Step

The extrusion mold 400 has at least two or more die holes 420 formed thereon, as shown in FIG. 1, and desirably, two die holes 420 are formed on the upper and lower portions of the extrusion mold 400, so that four extrudates are at the same time or selectively obtained upon one time extrusion. On the other hand, each die hole 420 takes a shape of "C".

According to the present invention, in more detail, the body 120 of the stop collar 100 takes a shape of "C" on a fitting portion 122 formed at the front surface thereof and has one or more check protrusions 140 formed on the outer surface thereof.

The body 120 taking the shape of "C" has a center angle θ in the range of 110 to 140° over the range from a center point to both end portions thereof, and desirably, the center angle θ is 130°.

The formation of the center angle θ enables the stop collar 100 to be easily fitted to the body 20 of the pipe fitting device 10. If the center angle θ is less than 100°, the fitting is difficult, and contrarily, if the center angle θ is over 140°, the stop collar 100 may be easily escaped from the body 20 of the pipe fitting device 10, while in use.

Further, the formation of the center angle θ in the range of 110 to 140° allows the entire portion of the body 120 except the fitting portion 122 to be formed at an angle in the range of 220 to 250°, so that the two check protrusions 140 are formed at the positions facing each other at an angle of 180°, that is, on a straight line, and guide pieces 180 are extended outward from the check protrusions 140 so as to guide the fitting of the stop collar 100 when the stop collar 100 is fastened to the body 20 of the pipe fitting device 10.

The check protrusions 140 push or pull by a worker's fingers so as to check the fitting state of the stop collar 100, and desirably, one to three check protrusions 140 are formed. Of course, three or more protrusions 140 may be formed, which is not desirable according to the characteristics of the fitting work.

For example, the pipe fitting device 10 to which the stop collar 100 according to the present invention is fastened is configured wherein the pipes p are fitted to both sides of the body 20 and they are fastened to each other by means of the tightening of nut members 40 to a fixing protrusion 30 by means of a pipe wrench or torque wrench. At this time, if the number of check protrusions 140 is large, the check protrusions 140 may interfere with the operation of the wrench.

According to the present invention, therefore, one to three check protrusions 140 are desirably formed.

Heat Treatment Step

The extrudate extruded through the extrusion mold 400 is subjected to heat treatment through which a first elastic force is applied to the stop collar 100 of the present invention.

In more detail, the extrudate is subjected to solution treatment wherein it is heated to a temperature in the range of 450 to 650° C. for 5 to 7 hours. Particularly, the AL raw material is subjected to aging treatment at a temperature in the range of 200 to 300° C. for 2 hours so as to improve hardness, and AL6061 is subjected to heat treatment and then quenching so as to improve surface hardness. The extrudate of the present invention, that is, the body 120 of the stop collar 100 has hardness in the range of 230 to 270 Hv, desirably hardness of 250 Hv.

According to the present invention, the body 120 of the stop collar 100 is made of aluminum having excellent moldability and easy machinability, and through the improvement of hardness of aluminum, the stop collar 100 can be repeatedly used.

Cutting Step

After the heat treatment, the extrudate is cut to a given length through a cutting machine.

The cutting machine used in the present invention includes a unit for fixing and releasing the extrudate, a conveying unit and a cutting unit, and if the cutting machine is activated in the state where the extrudate is fixed to the fixing and releasing unit, the conveying unit grasps the extrudate and at the same time the fixing state of the fixing unit is released.

If the conveying unit moves by a predetermined distance and stops there, the fixing unit presses and fixes the extrudate, and next, the cutting unit is operated to cut the extrudate.

One example of the cutting machine used in the present invention is a CNC (Computerized Numerical Control) lathe.

That is, the extrudate is fitted to a chuck of the CNC lathe and thus fixed and released thereto and therefrom. Next, the extrudate is taken and conveyed through a conveying unit of the CNC lathe, and in this case, a cutter is separately mounted.

The cutter is located in front of the chuck and has a circular saw fixedly connected to a motor thereof.

The motor is rotated at a low speed of 500 rpm or under and conducts precise cutting. Accordingly, the machining for the body 120 is finished.

Grinding Step

The body 120, that is, the extrudate is grinded before and after the cutting. Before the cutting, the outer surface of the extrudate is grinded so as to allow the outer appearance after anodizing as will be discussed later to be improved and further to allow the surface friction to be decreased to provide easy movement.

After the cutting, micro-burrs resulting from the cutting are removed and the surface impurities are also removed, thus allowing the anodizing to be easily conducted and further permitting the body 120 after fitted to the body 20 of the pipe fitting device 10 to be gently rotated.

Elastic Member Machining Step

The extrudate, that is, the body 120 of the present invention is coupled to the elastic member 220.

The elastic member 220 is made of spring steel which is resistant against repeated uses.

First, the spring steel is prepared to make the elastic member 220 through slotting of the spring steel.

If the basic raw material forming the elastic member 220 is prepared, folded portions 240 are formed by means of multi-foaming, and the folded portions 240 are open when the stop collar 100 is coupled to the pipe fitting device 10 and closed when the fastening is finished to allow the elastic force of the elastic member 220 to be more strengthened.

The folded portions 240 protrude outward from the elastic member 220, and they are bent at the same positions as the check protrusions 140 of the body 120. The number of folded portions 240 is the same as the check protrusions 140 of the body 120, and in some cases, it may be less than the number of check protrusions 140 of the body 120.

If the manufacturing of the elastic member 220 is finished, the elastic member 220 is coupled to the extrudate to manufacture the original shape of the stop collar 100.

The elastic member 220 and the inner surface of the extrudate face each other, and they are pressed and coupled to each other by means of a press device. In this case, the extrudate may have a groove portion formed on the inner surface thereof so as to fit the elastic member 220 thereto.

Extrudate Surface Treatment Step

A variety of colors are coated on the stop collar 100 according to the present invention. Through the formation of the colors, the use of the pipe fitting device 10 to which the stop collar 100 is fitted is recognized by a worker, and further, the pipes P are identified, thus easily conducting the maintenance of the pipes P.

According to the present invention, the surface of the stop collar 100 is coated with blue, yellow, red, black or the like, and desirably, the surface of the stop collar 100 is subjected to anodizing and then coated with ceramic. The formation of the ceramic prevents the stop collar 100 from slipping from the body 20 of the pipe fitting device 10 when fitted to the body 20 and fastened thereto by means of nuts. This will be discussed later.

According to the second embodiment of the present invention, the stop collar 100 further includes the identification member 300 coupled to the body 120.

The identification member 300 has a larger outer diameter than the body 120, and it is coupled to the outer surface of the body 120 in such a manner as to be easily recognized, thus allowing fitting and piping states to be checked by a worker.

According to the present invention, the identification member 300 is made of a synthetic resin or metal plate and finally manufactured through press machining and injection molding.

The identification member 300 takes a semicircular shape and includes coupling portions 340 formed on both side end portions thereof in such a manner as to be fitted to the check protrusions 140 of the body 120, an extension piece 320 formed in the middle portion thereof, and holes 322 punched onto the extension piece 320.

A card or identification tag hangs by the holes 322, and on the card or identification tag, are there the items related to the pipes or equipment connected by the pipe fitting device 10, such as management, check, pipe types, repair plans and the like.

Otherwise, the extension piece 320 pushes or pulls by the worker to check whether the fitting work is done well or not. This will be discussed later.

A reference numeral 360 is a protruding piece from the identification member 300 in such a manner as to be fitted to the fitting portion 122 of the body 120, and the formation of the protruding piece 360 permits the identification member 300 to be stably coupled to the body 120, together with the hook-shaped coupling portions 340, and allows the fitting portion 122 to push even when the rotation of the stop collar 100 is checked through the extension piece 320, thus preventing the identification member 300 from pushing.

On the other hand, the stop collar 100 manufactured in the above-mentioned method according to the present invention may have various shapes as shown in FIG. 5 and FIGS. 6A to 6C.

The basic type stop collar 100 according to the present invention is shown in FIG. 3. In this structure, the two check protrusions 140 are arranged to face each other, and the folded portions 240 of the elastic member 220 are located at the inside of the check protrusions 140.

Three check protrusions 140 are arranged in FIG. 5.

FIGS. 6A to 6C show the sectional views of the stop collar 100.

FIG. 6A shows inclined surfaces 202 formed on both sides of the elastic member 220, and the formation of the inclined surfaces 202 allows the interference occurring upon the fastening of the nut member to be avoided.

That is, when the inclined surfaces 202 are fitted to the body 20, they avoid the interfering with a male screw portion 28 of the body 20, thus allowing the stop collar 100 to be gently rotated.

FIG. 6B shows the inclined surface 202 formed only on one side of the elastic member 220, and FIG. 6C shows the elastic member 220 having one side protruding outward from the body 120.

Such various stop collars are selectively used according to the pipe fitting devices, pipes and environments.

According to the third embodiment of the present invention, as shown in FIGS. 8A and 8B, an elastic force is applied not to the elastic member, but to the body 120, thus achieving easy fastening.

In this structure, the stop collar has a concave groove portion 220a taking a shape of "V", square, or semicircle formed on the inner surface of the body 120, and thus, the fitting portion 122 is open and closed around the concave groove portion 220a, thus achieving the fastening to the pipe fitting device 10.

According to the third embodiment of the present invention, therefore, the stop collar 100 is manufactured by heating the raw material selected from the group consisting of aluminum or zinc to a temperature of 300° C. and extruding the heated raw material through an extrusion mold to have an extrudate having a shape of "C" at the front surface thereof and protrusions formed on the outer surface thereof. At this time, each die hole 420 formed on the extrusion mold 400 has a protruding portion so as to form the concave groove portion 220a.

After the extrusion, the extrudate is subjected to solution treatment wherein it is heated to a temperature in the range of 450 to 650° C. for 5 to 7 hours, and the heat-treated extrudate is subjected to cooling treatment wherein it is normalized or quenched.

The heat-treated extrudate is subjected to cutting wherein it intermittently moves and stops and then cuts to a given length through the rotation of a saw, to grinding wherein the burrs of the cut extrudate are removed, and to identification treatment wherein ceramic having any one of red, blue, yellow, and black is coated onto the surface of the extrudate to allow the uses of the pipes to be identified, thus completing the manufacturing of the stop collar 100 according to the present invention.

According to the third embodiment of the present invention, on the other hand, the stop collar 100 further includes locking protrusions 160 formed on the body 120 so as to prevent the escape from the pipe fitting device 10 after fastened to the pipe fitting device 10.

Under the above-mentioned structure, now, an explanation on the use state of the stop collar 100 according to the present invention will be given.

FIG. 9 shows a sectional view of the pipe fitting device 10 in which the stop collar 100 according to the present invention is adopted. The pipe fitting device 10 is suggested by the same applicant as the invention, and on the basis of the pipe fitting device 10, the use state of the stop collar 100 according to the present invention will be described.

As shown, the pipe fitting device 10 includes the body 20, the fitting nuts, that is, the nut members 40, and first and second ferrules 60 and 62. Particularly, the body 20, to which the stop collars 100 according to the present invention are detachably mounted, has smooth surfaces 34 formed on both sides thereof.

The body 20 has a circular pipe body 22. The body 20 further has a fitting hole 24 formed on the internal center of the pipe body 22 by means of cutting and machining The fitting hole 24 is adapted to fit the left and right side pipes P thereto and has inward protruding portions formed at the center portion thereof.

The body 20 further has a fixing protruding portion 30 protruding outward from the center of the outer peripheral surface of the pipe body 22. The fixing protruding portion 30 has vertical contacting surfaces 32 formed on both sides thereof in such a manner as to come into close contact with the stop collars 100 according to the present invention to allow tightening degrees of the nut members 40 to be recognized by the worker.

Further, the body 20 includes the male screw portions 28 formed on both side peripheries of the pipe body 22 and the smooth surfaces 34 formed between the vertical contacting surfaces 32 on both sides of the fixing protruding portion 30 and the male screw portions 28, onto which the stop collars 100 are fastened.

The smooth surfaces 34, which are adapted to allow the stop collars 100 to be gently rotated, without being locked, have widths larger than or equal to the width of the stop collar 100. Further, the stop collar 100 according to the present invention has the inclined surfaces 102 formed on both side surfaces or one side surface thereof, so that it can be gently rotated, without having any interfere with the male screw portions 28.

The nut members 40 are screw-coupled to the male screw portions 28 formed on both side peripheries of the pipe body 22 of the body 20. The nut members 40 include female screw portions 42 formed on the inner peripheries of the front ends thereof in such a manner as to be screw-coupled to the male screw portions 28 and locking stepped projections 44 formed on the internal rear end portions thereof in such a manner as to lock the rear surfaces of the second ferrules 60 thereonto, so that when the nut members 40 are tightened, the first and second ferrules 60 are moved to pressurize the pipes P.

The first and second ferrules 60 and 62 are separated from each other under the structure wherein the first ferrules 60 are coupled to the inclined surfaces of the end peripheries of the pipe body 22 and the second ferrules 62 are coupled between the rear surfaces of the first ferrules 60 and the locking stepped projections 44 of the nut members 40. On the other hand, the first and second ferrules 60 and 62 are generally used in this field, and for the brevity of the description, therefore, therefore, they will be not in detail explained anymore.

The stop collars 100 adopted in the pipe fitting device 10 as mentioned above are fitted to the smooth surfaces 34 between the fixing protruding portions 30 and the male screw portions 28, and if the nut members 40 are fastened, they come into close contact with the vertical contacting surfaces 32 of the fixing protruding portions 30 and restrained by means of the nut members 40.

That is, if the stop collars 100 are fitted to the smooth surfaces 34 of the body 20, the guide pieces 180 are open to allow each stop collar 100 to be fitted to the body 20, and in the fitting state, the stop collar 100 is not escaped well from the body 20 through the elasticity of the elastic member 200.

Next, the pipes P are fitted to both sides of the body 20, and if the nut members 40 are fastened, the first and second ferrules 60 and 62 are moved together with the nut members 40 to pressurize and grasp the pipes P, thus connecting the pipes P with each other.

At this time, the tightened nut members 40 allow the stop collars 100 to come into close contact with the fixing protruding portion 30 and thus to pressurize the fixing protruding portion 30. During the tightening of the nut members 40, accordingly, if the stop collars 100 are not rotated anymore when the check protrusions 140 are pushed or pulled by the worker, there is no need to tighten the nut members 40 anymore.

In this state, that is, the pipes P are kept stably connected, without being deformed by the first and second ferrules 60 and 62.

Contrarily, if the stop collars 100 are rotated when the check protrusions 140 are pushed by the worker, the nut members 40 should be further tightened. In this case, the nut members 40 are further tightened to maintain the optimum connection state of the pipes P.

In this process, it can be checked whether the stop collar 100 is rotated or not by means of the identification member 300. Since the checking protrusions 140 are relatively small according to the locations of the pipe fitting device 10 to which the stop collar 100 is adopted, the devices and pipes to which the pipe fitting device 10 is adopted, and the workers, it is difficult to check whether the stop collar 100 is rotated or not.

At this time, the identification member 300 is coupled to the outer surface of the stop collar 100, and through the extension piece 320 of the identification member 300, it is checked whether the stop collar 100 is rotated or not.

Of course, the identification member 300 is easily recognized by the worker to allow checking and maintenance for the pipes P to be easily conducted.

Further, the rotating slip of the stop collars 100 between the vertical contacting surfaces 32 and the nut members 40 can be prevented through the ceramic coated on the surfaces of the stop collars 100.

As described above, there is provided the method for manufacturing the stop collar for the pipe fitting device according to the present invention wherein the body of the stop collar is molded through the extrusion mold and the molded product is improved in hardness through heat treatment, thus providing high elastic force, easy assembling, and repeatable uses, and the ceramic film is formed on the surface of the stop collar through the anodizing treatment, thus preventing the rotating slip caused by the fastening to fitting nuts.

According to the present invention, additionally, it can be checked by the worker whether the pipes are connected to each other at the optimum state, thus maintaining the optimum grasping state, and further, the stop collar can prevent the pipes and the pipe fitting device from being broken or damaged, thus achieving perfect sealing state.

Moreover, the stop collar according to the present invention has the shape of "C" in such a manner as to be press-fitted to the pipe fitting device and further has the inclined surfaces adapted to provide easy fastening and interference avoidance, thus obtaining gentle rotation, so that the connected state of the pipes can be easily recognized by the worker.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for manufacturing a stop collar for a pipe fitting device, the stop collar is disposed on a body of the pipe fitting device to recognize a connected state of pipes, the method comprising the steps of:
    preparing a raw material selected from a group consisting of aluminum or zinc and heating the raw material to a temperature in a range of 550 to 650° C.;
    extruding the heated raw material through an extrusion mold to obtain an extrudate having a C shape at a front surface thereof and having one or more check protrusions formed on an outer surface thereof and a concave groove portion formed on an inner surface thereof to apply an elastic force to the stop collar;
    subjecting the extrudate to a solution treatment to heat the extrudate to a temperature in a range of 450 to 650° C. for 5 to 7 hours;
    subjecting the heat-treated extrudate to a cooling treatment to normalize or quench the extrudate;
    intermittently moving and stopping the extrudate to cut the extrudate to a predetermined length through a rotation of a saw;
    grinding the cut extrudate to remove burrs from thereon; and
    coating ceramic having any one of red, blue, yellow, and black color onto a surface of the cut extrudate to provide an identification of use for the pipes.

2. The method according to claim 1, further comprising the step of forming the check protrusions on both ends and at a center of the extrudate.

3. The method according to claim 1, further comprising the step of extruding at least two or more extrudates with the extrusion mold having die holes with a C shape formed on upper and lower portions.

4. The method according to claim 1, further comprising the steps of fitting the extrudate to a chuck of a computerized numerical control lathe, and cutting the extrudate moved from the chuck by a rotary cutter connected to a motor shaft disposed in front of the chuck and rotating at a speed of 500 rpm or under.

5. The method according to claim 1, wherein the extrudate subjected to the heat treatment and the cooling treatment has a hardness in the range of 200 to 300 Hv.

6. The method according to claim 1, further comprising the step of forming the concave groove portion on the inner surface of the extrudate with the extrusion mold having a protruding portion formed on each die hole.

7. A stop collar for the pipe fitting device manufactured by the method according to claim 1.

8. A method for manufacturing a stop collar for a pipe fitting device, the stop collar is disposed on a body of the pipe fitting device to recognize a connected state of pipes, the method comprising the steps of:
    preparing a raw material selected from a group consisting of aluminum or zinc and heating the raw material to a temperature greater than 350° C.;
    extruding the heated raw material through an extrusion mold to obtain an extrudate having a C shape at a front surface thereof and having one or more check protrusions formed on a outer surface thereof;
    subjecting the extrudate to a solution treatment to heat the extrudate to a temperature in a range of 450 to 650° C. for 5 to 7 hours;
    subjecting the heat-treated extrudate to a cooling treatment to normalize or quench the extrudate;
    intermittently moving and stopping the heat-treated extrudate to cut the heat-treated extrudate to a predetermined length through a rotation of a saw;
    slotting a metal spring steel to provide an elastic member;
    forming folded portions on the elastic member by multi-foaming to provide open or closed folded portions, the folded portions are bent at same positions as the check protrusions of the extrudate;
    pressing the elastic member in contact with an inner surface of the cut extrudate to each other to couple the cut extrudate and the elastic member, thereby obtaining the stop collar with the C shape;
    removing burrs from the stop collar; and
    coating ceramic having any one of red, blue, yellow, and black color onto a surface of the stop collar to provide an identification of use for the pipes.

9. The method according to claim 8, further comprising the step of extruding at least two or more extrudates with the extrusion mold having die holes with a C shape formed on upper and lower portions.

10. The method according to claim 8, further comprising the steps of fitting the extrudate to a chuck of a computerized numerical control lathe, and cutting the extrudate moved from the chuck by a rotary cutter connected to a motor shaft disposed in front of the chuck and rotating at a speed of 500 rpm or under.

11. The method according to claim 8, wherein the extrudate subjected to the heat treatment and the cooling treatment has a hardness in the range of 200 to 300 Hv.

12. A stop collar for the pipe fitting device manufactured by the method according to claim 11.

* * * * *